(No Model.) 3 Sheets—Sheet 1.
W. HENDERSON.
PROCESS OF MANUFACTURING METALLIC CROSS BARS AND RAILS FOR WINDOW SASHES.
No. 412,751. Patented Oct. 15, 1889.
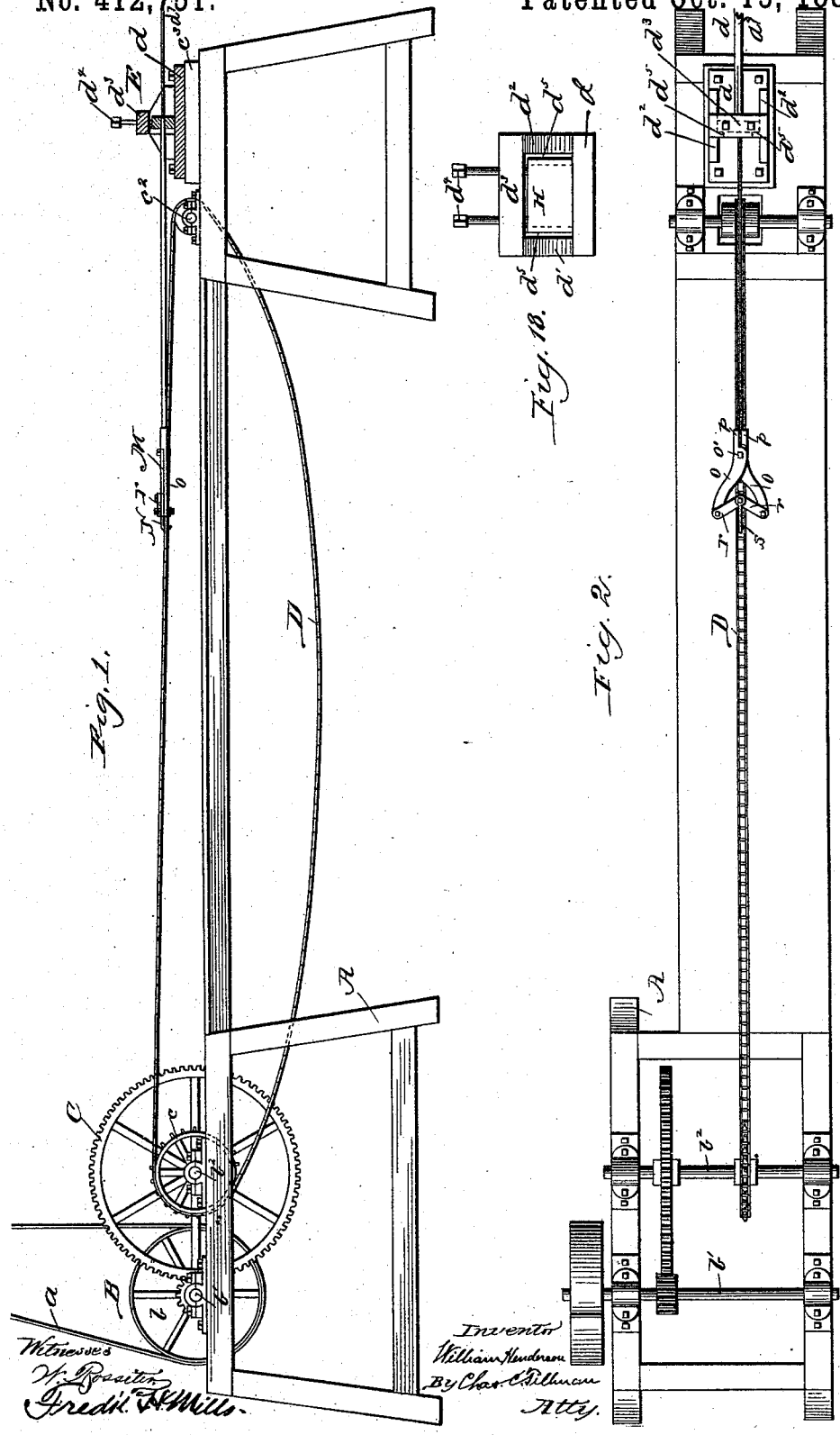

(No Model.)  3 Sheets—Sheet 2.
W. HENDERSON.
PROCESS OF MANUFACTURING METALLIC CROSS BARS AND RAILS FOR WINDOW SASHES.
No. 412,751. Patented Oct. 15, 1889.
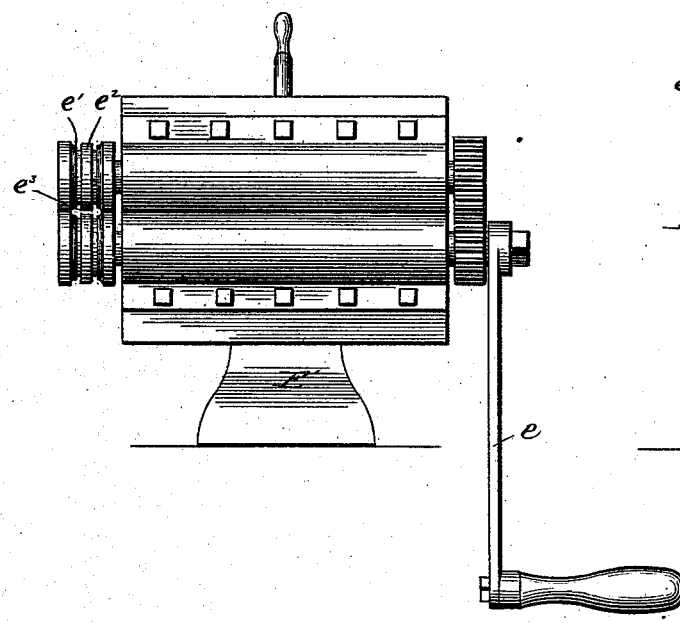
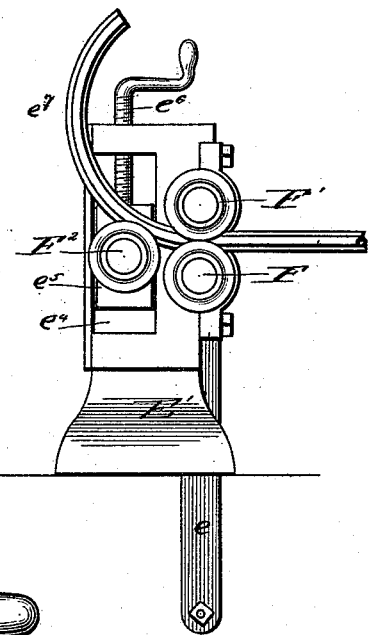
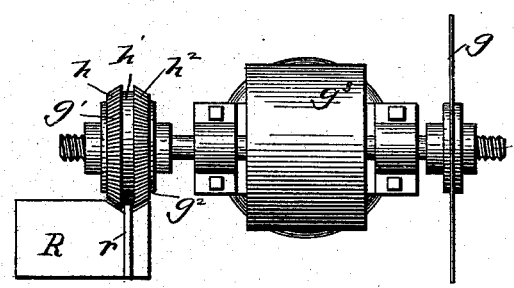
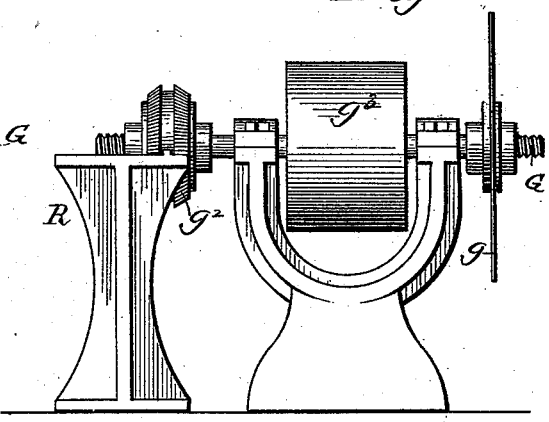
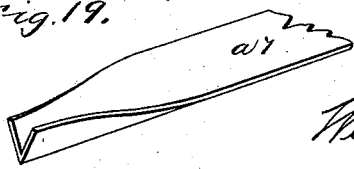
Witnesses
W. Rossiter
Fredk. H. Mills
Inventor
William Henderson
By Chas. C. Tillman
Atty.

(No Model.)  3 Sheets—Sheet 3.
W. HENDERSON.
PROCESS OF MANUFACTURING METALLIC CROSS BARS AND RAILS FOR WINDOW SASHES.
No. 412,751.  Patented Oct. 15, 1889.
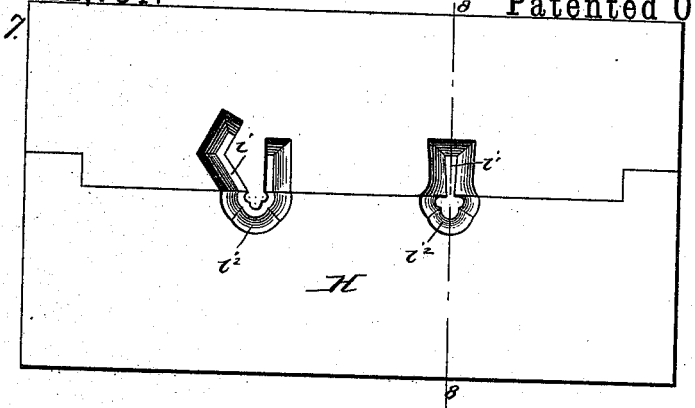
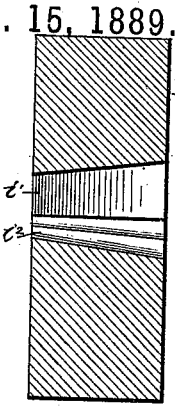
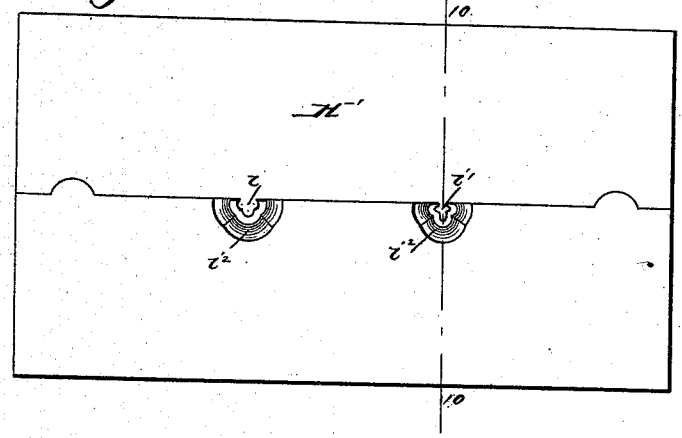
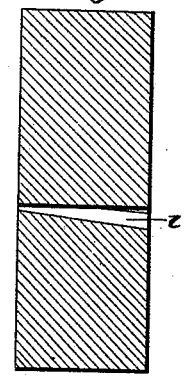
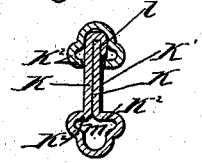
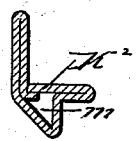
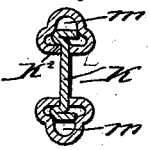
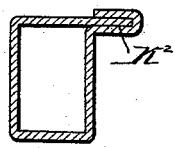
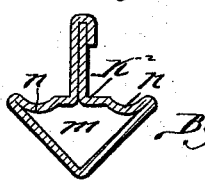
Witnesses
W. Rossiter
Fred'k N. Weil.
Inventor
William Henderson
By Chas. C. Tillman
Atty.
N. PETERS, Photo-Lithographer, Washington, D. C.

UNITED STATES PATENT OFFICE.

WILLIAM HENDERSON, OF CHICAGO, ILLINOIS.

PROCESS OF MANUFACTURING METALLIC CROSS-BARS AND RAILS FOR WINDOW-SASHES.

SPECIFICATION forming part of Letters Patent No. 412,751, dated October 15, 1889.

Application filed April 29, 1889. Serial No. 309,055. (No model.)

*To all whom it may concern:*

Be it known that I, WILLIAM HENDERSON, a subject of the Queen of Great Britain, residing at Chicago, in the county of Cook and State of Illinois, have invented a certain new and useful Process of Manufacturing Metallic Cross-Bars and Rails for Window-Sashes and Analogous Structures, of which the following is a specification.

My invention relates to improvements in the process of manufacturing metallic cross-bars and rails for window-sashes, skylights, and other structures; and it consists in certain peculiarities of the method of operation, as will be hereinafter more fully set forth and specifically claimed.

In order to enable others skilled in the art to which my invention pertains to use the same, I will now proceed to describe it, referring to the accompanying drawings, in which I have illustrated the machine or devices I prefer to use, and which show how the process is carried on.

Figure 1 is a side elevation of my machine as it appears when in operation. Fig. 2 is a plan view of the same. Fig. 3 shows a view in side elevation of my bending or conforming device. Fig. 4 is an end view of the same. Fig. 5 is a plan view of my machine for forming or notching the ends of the bars. Fig. 6 is a view in side elevation of the same. Fig. 7 shows a face view of a die for making the lower portion of the bar. Fig. 8 is a cross-section of Fig. 7, taken on line 8 8. Fig. 9 is a face view of a die for forming the cap or upper portion of the bar. Fig. 10 is a cross-section of the same on line 10 10. Figs. 11, 12, 13, 14, 15, 16, and 17 show end views of modifications of the bars or rails when completed. Fig. 18 is an end view of the die-retaining device, and Fig. 19 is a view of a strip of metal with end formed for insertion into the opening of the die.

Similar letters refer to like parts throughout the different views of the drawings.

A represents the main or supporting frame of my machine, on and near one end of which the pulley B and a small pinion $b$, mounted on and rigidly secured to a suitable shaft $b'$, are journaled in the ordinary manner.

To the pulley B, and by means of a belt $a$ or otherwise, is applied the power for operating the entire machine.

On the frame A, at a proper distance from the shaft $b'$, rigidly mounted on a shaft $b^2$, is journaled a cogged gear-wheel C and a sprocket-wheel $c$. Near the other end, and on the frame A, is journaled a suitable pulley $c^2$, over which the endless chain D freely passes, being drawn over said pulley by engagement with the sprocket-wheel $c$, as will be clearly seen by reference to Figs. 1 and 2 of the drawings.

At the end of the frame and near the pulley $c$, I provide the frame with a table or platform $c^3$, upon which is secured the die-retaining device or frame E, which consists of a base-plate $d$, two upright side pieces $d'$ $d^2$, and a cross-bar $d^3$ at the top, provided with set-screws $d^4$, the whole forming a hollow for the reception and retention of the die-plate H or H', which is firmly held in place by the set-screws and prevented from being drawn through the hollow of the frame by the inwardly-projecting lugs $d^5$, as shown, or otherwise. Within this hollow frame or retaining device the die-plate H or H', provided with desirable apertures $i$ and $i'$, is removably secured, and a strip of metal $a^7$, having its end formed tapering, so as to be easily inserted in said aperture, is forced through until it projects sufficiently to allow the gripper $m$ to grip the same, as will be presently explained.

In Figs. 7 and 9 I have shown two dies H H', preferably made of steel and of two pieces, which I use in forming the metallic bar and cap. They may be formed with openings or apertures $i$ $i'$, of any form to produce a bar of any desired contour or shape and in numerous styles of configuration; but the present forms of apertures shown in the die-plates are adapted to produce a bar with form as illustrated in Fig. 11, which is my preferred construction; yet it is apparent that I may employ a form of die to produce any of the forms shown in Figs. 11 to 17, inclusive, or, in fact, almost any conceivable shape.

In the present instance I have shown the dies H and H' formed with two openings $i$ and $i'$ each through the same, said openings being made with a wide flaring mouth $i^2$ on the face of the plate for the easy insertion of the end of the metal strip. The opening $i$ in each of the dies is for giving to the metal the first formation, and the other opening $i'$ the finished or completed form, the die H forming the lower portion or bar and die H' the cap or fastening or upper portion, which, when joined together, produce a bar of the form shown in Fig. 11.

Figs. 11 to 17, inclusive, may represent either modifications of the form of the aperture in the die or the end views of bars produced by the respective dies, and I shall refer to them as either.

Fig. 11 shows the end of a bar formed by a die of that shape, having a rib K, and on one or both sides of the said rib a groove K' for the reception and retention of the edge of the glass formed by the shoulders, ledges, or rests $K^2$. In this construction, as well as others, the die forming the rib K may be made so as to form a flange or enlargement $l$ at the top, as shown, or without the same; or in forming a bar of three separate pieces of metal, as shown in Fig. 14, I may use a die of such shape as to form it with or without enlargement at the top or bottom of the rib; but I prefer a flange or enlargement, as it affords a more secure fastening. In the different modifications I have shown them with a hollow $m$ above and beneath the shoulders or rests $K^2$; but of course this could be dispensed with and a die used to form the bar with a flat top and bottom surface, yet having the shoulders and grooves as before, or one may be used to form a cap with an opening having parallel sides for the rib, or a projection having parallel sides, so that the joint can be made at any point on the rib.

Fig. 17 shows the product of a form of die especially adapted for skylight bars, and it is made to form the bar with a rib K and shoulder or shoulders $K^2$, as before, and in addition a trough $n$ on one or both sides of the rib, which trough is designed to catch the condensed moisture which may accumulate on the under surface of the glass.

In Figs. 1 and 2 will be seen my gripping device M, connected to the chain belt D, and grasping the end of the bar as it appears when being drawn through the die. The gripper is made of two pieces $o$, pivoted together near one end by a pin $o'$, and has the inner surfaces of its jaws $p\ p$ roughened, so as to prevent slipping. To the other ends of the pieces $o$ is secured a toggle-joint $r$, and at the elbow of this joint I loosely provide a hook S, which hooks into the link of the chain belt and is drawn along by said belt, the toggle-joint thus forcing the upper ends of the pieces $o\ o$ apart and closing more tightly the jaws $p\ p$ on the bar, as is obvious.

In Figs. 3 and 4 I have shown my bending or conforming device or machine, which I use after the bar $e^7$ has been formed as desired on the die-machine; and it consists of a suitable frame E', upon which is journaled a series of rollers (preferably three in number) F, F', and $F^2$, two of which F and F' are geared together at one end by suitable cogged gears and are operated by means of a handle $e$, secured to one of them, or otherwise, if desired. At the opposite end of the rollers and outside of the frame I provide each roller on its surface with a groove or grooves of a form to conform to the shape of the bar after it has been finished by the dies. In the drawings the groove is shown as formed in the roller; but I may use suitable collars formed with any desired form of groove and adjust them to the rollers and accomplish the same result. Of course the form of the grooves may be of any shape that the bar may be; but I have shown in the drawings at $e^3$ the same formation illustrated in the dies and at Fig. 11. To the rear of these rollers, in a suitable recess $e^4$, vertical in length, I place the roller $F^2$, which is provided with a similar groove to those just described. This roller is journaled on a vertically sliding or adjustable bearing $e^5$, which is adjusted to any point by means of the screw-threaded crank-rod $e^6$. It will be seen that by inserting the end of the bar into the opening $e^3$ between the rollers F and F' and revolving the rollers it will be drawn through and will pass over the roller $F^2$, the raising or lowering of which will produce any degree of a curve desired, and at the same time will fit the cap and bar to each other when they are made in separate pieces.

Figs. 5 and 6 illustrate my device for cutting the bar into proper lengths and for notching or finishing the ends of the same; and it consists of the shaft G, journaled in suitable bearings on a frame, and having mounted on said shaft near one end an ordinary circular saw $g$ and on the other end a plurality of circular disks, but preferably three in number, $h\ h'\ h^2$. Two of these are beveled at an angle, as shown at $g'$ in Fig. 5, and are provided on their beveled peripheries with sharp oblique teeth $g^2$. The disk $h'$ is located between the disks $h$ and $h^2$ and has a smooth periphery, thus acting as a guide or stop to the bar.

Between the disk $h^2$ and the saw $g$, upon the shaft G, is secured a pulley $g^3$, to which is applied the power for operating the device.

On one side of the disks and adjacent thereto I provide a suitable table or support R, provided with a raised bead $r$ on its upper surface, as shown. The table serves as a support when the ends of the bars are pressed against the disks, and the bead $r$, fitting in the groove of the bar, serves as a guide in this operation.

The operation and process of my improvements are simple and as follows: The die is placed in the retaining device and is firmly secured there by the set-screws at the top of this device for this purpose. The gripping device M is then hooked to the chain belt, and the end of the metal $a^7$ is forced through the die until it projects far enough to allow the gripper to take hold of the end of the bar.

The power is then applied to the pulley B, and the chain belt, engaging with the sprocket-wheel, tightens the gripper on the bar and draws it through the die. When this process is completed, the bar is applied horizontally to the saw and cut into proper lengths, after which the ends of the same are notched by holding them against the revolving disks, after which the bar is passed through the bending or conforming device and formed into any desired curve, when the bar is complete and ready for the sash.

The drawings illustrate my bending or conforming device and cutter and end-notching machine as separate devices from the die or bar forming machine; but it is evident that they may all be mounted on the same frame and operated by the same power, and I sometimes so construct it that after the metal is drawn through the die and given any desired form it may be cut in suitable lengths and have its ends notched, and then passed through the rollers and curved or bent in any form or shape.

Having thus described my invention, what I claim as new, and desire to secure by Letters Patent, is—

1. The herein-described process of manufacturing cross-bars, rails, and fastenings for window-sashes, &c., consisting, first, in passing the strips of metal through a die or dies giving the bars the desired conformation or shape, then cutting or sawing the formed strips into proper lengths, then notching the ends of the strips, and then passing the notched strips through a device for bending the same into suitable shape or curve ready for use, substantially as and for the purpose set forth.

2. The herein-described process of manufacturing metallic cross-bars, rails, and fastenings for window-sashes, consisting, first, in drawing the strips of metal through a die or dies making the proper conformation or shape, then placing the strips horizontally against a revolving circular saw and cutting them to proper lengths, then notching the ends of the formed strips by placing them longitudinally against a series of revolving disks, then passing the notched strips through a series of rollers, thus bending them to a proper curve ready for use, substantially as shown and described, and for the purpose set forth.

3. The herein-described process of manufacturing metallic cross-bars, rails, and fastenings for window-sashes, consisting, first, in passing strips of metal through a die or dies forming a bar and cap of desired conformation, then placing the cap on the rib of the bar and cutting them into proper lengths, then notching the ends of the strip, and then passing the notched strips through a device for bending the same to a desired curve, then removing the adjustable cap and clipping the ends of the rib of the bar at a desired angle, substantially as shown and described, and for the purpose set forth.

4. The herein-described method of manufacturing hollow metallic cross-bars, rails, and fastenings for window-sashes, consisting, first, of forming a metallic bar and cap in separate pieces, then adjusting the cap on the rib or web of the bar, then bending, cutting, and notching the same as a whole, then removing the adjustable cap and cutting the ends of the web or rib of the bar, substantially as and for the purpose specified.

In testimony whereof I have hereunto set my hand and affixed my seal this 24th day of April, 1889.

WILLIAM HENDERSON. [L. S.]

In presence of—
ROBERT HENDERSON,
CHAS. C. TILLMAN.